(12) United States Patent
Dundar et al.

(10) Patent No.: US 12,325,900 B2
(45) Date of Patent: Jun. 10, 2025

(54) ALUMINUM ALLOY MATERIAL SUITABLE FOR USE IN THE FOOD INDUSTRY AND PRODUCTION METHOD THEREOF

(71) Applicant: ASSAN ALÜMINYUM SANAYI VE TICARET ANONIM SIRKETI, Istanbul (TR)

(72) Inventors: Mustafa Murat Dundar, Istanbul (TR); Mert Gunyuz, Istanbul (TR); Cemil Isiksacan, Istanbul (TR); Edip Ayberk Muharremoglu, Istanbul (TR)

(*) Notice: Subject to any disclaimer, the term of this patent is extended or adjusted under 35 U.S.C. 154(b) by 54 days.

(21) Appl. No.: 17/626,746

(22) PCT Filed: Mar. 12, 2021

(86) PCT No.: PCT/TR2021/050225
§ 371 (c)(1),
(2) Date: Jan. 12, 2022

(87) PCT Pub. No.: WO2022/139717
PCT Pub. Date: Jun. 30, 2022

(65) Prior Publication Data
US 2022/0396854 A1    Dec. 15, 2022

(30) Foreign Application Priority Data
Dec. 23, 2020   (TR) .................. 2020/21497

(51) Int. Cl.
*C22C 21/00* (2006.01)
*C21D 8/02* (2006.01)
*C21D 9/00* (2006.01)
*C22C 1/02* (2006.01)

(52) U.S. Cl.
CPC ............. *C22C 21/00* (2013.01); *C21D 8/0236* (2013.01); *C21D 8/0273* (2013.01); *C21D 9/0068* (2013.01); *C22C 1/026* (2013.01)

(58) Field of Classification Search
CPC ......... C22C 21/00; C22C 21/02; C22C 21/06; C22C 21/08; C22C 21/10; C22C 1/026; C22F 1/04; C22F 1/043; C22F 1/047; C22F 1/05; C22F 1/053
See application file for complete search history.

(56) References Cited

U.S. PATENT DOCUMENTS 4,409,036 A * 10/1983 Vernam ................. F28F 21/084
148/692

FOREIGN PATENT DOCUMENTS

| CN | 111690843 A | 9/2020 |
| EP | 1316623 B1 | 9/2007 |
| WO | 2007006426 A3 | 7/2007 |
| WO | 2020018477 A1 | 1/2020 |
| WO | 2020023375 A1 | 1/2020 |

OTHER PUBLICATIONS

International Search Report and Written Opinion of the International Searching Authority for corresponding PCT/TR2021/050225, dated Aug. 24, 2021.

* cited by examiner

*Primary Examiner* — Jessee R Roe
(74) *Attorney, Agent, or Firm* — Egbert, McDaniel & Swartz, PLLC

(57) ABSTRACT

A method for producing aluminum alloy materials suitable for use in the food industry includes processing of a liquid metal mixture having strontium in addition to aluminum by a twin roll continuous casting technique.

2 Claims, 1 Drawing Sheet

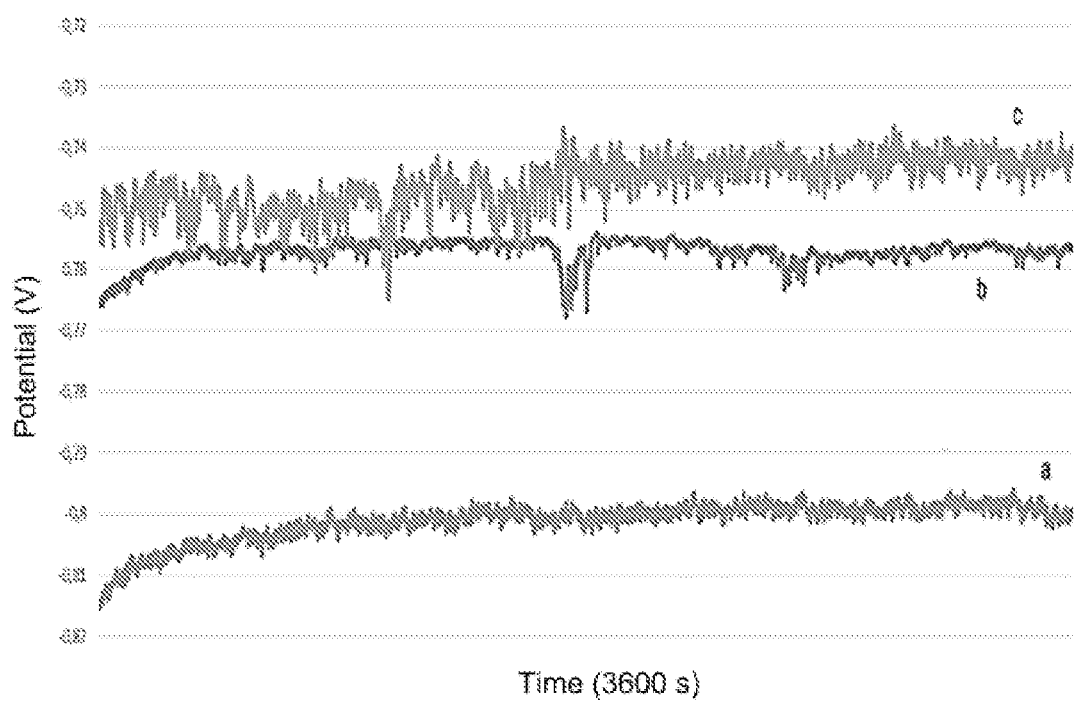

ALUMINUM ALLOY MATERIAL SUITABLE FOR USE IN THE FOOD INDUSTRY AND PRODUCTION METHOD THEREOF

TECHNICAL FIELD

The present invention relates to aluminum alloy materials with improved mechanical and electrochemical properties in the form of sheet or foil that are suitable for use to be in direct contact with food during processing, heating, cooling and preserving of food, and production methods thereof.

STATE OF THE ART

Aluminum sheet and foil products are being produced nowadays predominantly by two different methods. The first one of these is the widely used production method with direct chill casting. In this method liquid metal is fed to a cooled mold and pulled downward in accord with the solidification rate of the metal. The continuation of solidification after getting in touch with the mold is being provided by spraying water on the surface of solidified metal surface.

In direct chill casting method, the fact that casting conditions can be maintained without changing throughout the entire process renders the properties such as grain size, chemical composition, porosity and strength to remain fixed throughout the ingot. Nonetheless, the fact that internal structure and chemical distribution of the material demonstrating a uniform property paves the way for the electrochemical properties of the material to be uniformly distributed and improved throughout the structure.

In prior art applications, studies aimed at development of mechanical properties of these alloys produced by direct chill casting method and demonstrating superior properties electrochemically are being performed. In relation therewith, how addition of different compositions into metal alloys affects mechanical properties of the material and production processes is being observed.

In this context, patent document number WO2020018477 which is present in prior art, the production of an aluminum alloy comprising manganese and/or strontium by direct casting method is disclosed. In this method based on directly cooling the liquid metal received inside the mold, it has been seen that the increase in the amount of manganese and/or strontium has provided advantage in terms of settling of the alloy in the mold, solidification and cleanly removal from the mold. That is to say, it is indicated that these components added to the alloy cause improvement specific to coating of the alloy.

Another method commonly used in the production of sheet and foil is the continuous casting method. The twin roll continuous casting method which is a breakdown of this is based on the principle of solidifying the liquid metal between water cooled rollers to the desired thickness followed by winding as cast roll. In the twin roll continuous casting method, solidification realized in the material is very fast compared to direct chill casting method. This causes a rather different case to appear in terms of microstructural and compositional sense. These properties which demonstrate more uniform behavior in the direct chill casting method differ from surface to center in the twin roll continuous casting method. The difference in the solidification rate between the surface and center of the material directly effects the distribution of alloy elements within the material and thus chemical compositions of intermetallic structures. The formation of rich intermetallics in the alloying elements leads to an electrochemical discrepancy between the main matrix and these structures which in turn cause observation of decrease in the electrochemical properties of the material.

In patent document number TR2007/08330 present in prior art, a method aimed at production of aluminum alloy products by roller forming is being set forth. It has been indicated that the products produced with the method are suitable for use predominantly in construction industry venetian blind elements, skylights, panel and front façades. It has been disclosed that said aluminum alloys comprise silicon, iron, copper, magnesium and manganese, and that raising the bending and notching resistance of the final product with the specifically determined ratios of has been aimed.

As can be seen from the above explanations, the production of aluminum alloys shows great differences both in the technique employed in the production and alloy content, and also in terms of areas of usage of the final product. Considering the fact that the components used in the alloy impart different advantages according to the production method of the final product and purpose of usage, what kind of properties the alloys will demonstrate in different compositions at different cooling and heating rates is still an area open to research. In this respect, it is envisioned that there exists still a need in the art for aluminum alloys produced in continuous and roller systems in which elevated heat is applied, and which have attained high mechanical properties as well as improved electrochemical properties by eliminating disadvantages while benefiting the advantages of these systems.

BRIEF DESCRIPTION OF THE INVENTION

The present invention relates to an aluminum alloy material suitable for use in the food industry which meet the above mentioned requirements, which eliminate all disadvantages and which offer some additional advantages, and its method of production.

The main aim of the invention is to develop aluminum alloy materials with improved mechanical and electrochemical properties that are suitable for use to be in direct contact with food during processing, heating, cooling and preserving of food, and production methods thereof.

Another aim of the invention is to develop aluminum alloy materials in the form of sheet or foil which are suitable for use in production of products that enable preserving the food by being coated or packaged.

Another aim of the invention is to develop a method for the production of said aluminum alloy materials in a continuous system.

Another aim of the invention is to develop a production method in which fast solidification is provided, and despite this, improved mechanical and electrochemical properties are provided in the final product.

Another aim of the invention is to develop a production method in which production cost is lowered by providing savings in energy and time.

In order to accomplish the above mentioned objects, the invention is a method for the production of aluminum alloy materials suitable for use in food industry, and it comprises processing of a liquid metal mixture comprising strontium in addition to aluminum by twin roller continuous casting technique.

Structural and characteristic features of the invention and all of its advantages will be understood more clearly by means of the detailed description given below and therefore it should be appreciated by considering this detailed description.

DESCRIPTION OF DRAWINGS

FIG. 1. open circuit potential measurement graphs that provide information about the corrosion resistance of materials.

a: Corrosion potential of the material produced from strontium-free aluminum alloy by continuous casting method b: Corrosion potential of the material produced from strontium-free aluminum alloy by direct chill casting method c: Corrosion potential of the material produced from strontium-containing aluminum alloy by continuous casting method

DETAILED DESCRIPTION OF THE INVENTION

In this detailed description, an aluminum alloy material of the invention suitable for use in food industry and production method thereof are described aimed at only better understanding of the subject and without forming any limiting effects.

The invention is a method for the production of aluminum alloy materials suitable for use in food industry, and it comprises processing of a liquid metal mixture comprising strontium in addition to aluminum by twin roll continuous casting technique.

In the preferred embodiment of the invention, said liquid metal mixture comprises also at least one more component selected from the group comprising silicon, iron, copper, manganese, magnesium and zinc.

In the preferred embodiment, the method of production of the invention comprises the processing steps of;
i. Casting liquid metal mixture as a coil in the twin roller continuous casting system,
ii. Annealing of the coil,
iii. Thinning the annealed coil by cold rolling,
iv. Thinning the thinned material until it reaches the thickness of the final product by rolling again,
v. Annealing of the aluminum alloy material which has been brought to the thickness of the final product.

According to a preferred embodiment of the invention, the liquid metal mixture mentioned in process step number (i) comprises at least one more component selected from the group comprising aluminum in the ratio of at least 95% by weight, as well as strontium in the ratio of 0.001-0.50% by weight and also silicon, iron, copper, manganese, magnesium and zinc. Said casting process mentioned again in the same process step is being performed at the rate of 50-150 mm/minute, preferably at 63-90 mm/minute. Thickness of the casting is in the range from 3 to 10 mm, more preferably in the range from 7 to 10 mm. The temperature at which casting is performed is selected in the range from 660 to 710° C.

Parameters given here directly affect both the capability of the casted material to take shape and also the microstructure formed in the final material. With these specifically determined parameters, casting material taking shape by being casted in a uniform manner and the final material that is formed in this manner having a uniform microstructure are being ensured.

Annealing process of the liquid metal mixture taken to the twin roll continuous casting system in process step number (ii) is being performed preferably at a temperature of 500-600° C. Annealing process is being continued between 4-10 hours, preferably for 8 hours. The high temperature applied here is the temperature required for realizing a uniform variation in the microstructure of the casting material. Said temperature value is essential for the invention of the patent to carry out its function. The cast material annealed in process step number (ii) gets uniform gradually and elimination of the segregations in the structure is being provided. This process also provides the deformation realized in process step number (iii) which follows this step to be applied more easily.

According to the preferred embodiment of the invention, cold rolling mentioned in the scope of process step number (iii) is being performed by deforming the annealed metal mixture in the ratio of at least 90%, that is to say by thinning it. This deformation ratio is preferably 96%, and the foil thickness of the material at the end of this process is in the range from 0.20 to 0.40 mm. That is to say, the material is being thinned by the rollers until it reaches this thickness.

The purpose of the cold rolling process repeated in process step number (iv) following this is to bring the material to the thickness of the final product. The final thickness mentioned here is preferably in the range from 0.030 to 0.20 mm, and deformation in the ratio of at least 70% is being realized on the material for this.

Rolling processes applied in steps number (iii) and (iv) provide the material to reach to the desired thickness on one hand and increase its strength on the other hand.

Aluminum alloy whose strength is finally increased by rolling and brought to the final thickness is being subjected to annealing process at a temperature of preferably 300-450° C. for a range from 2 to 6 hours. This process provides the entire structure to be uniformly re-crystallized; having uniformity in the mechanical and electrochemical sense, and similar properties in each direction in the deep drawing process of the material.

The invention is also an aluminum alloy material produced with a method such as the one in any of the above applications, and being suitable for use in the food industry.

According to the preferred embodiment of the invention, said aluminum alloy material is in the form of foil or sheet.

In the preferred embodiment of the invention, said aluminum alloy material comprises;
95.85-98.35% aluminum,
0.05-0.25% strontium,
0.10-0.40% silicon,
1.20-2.00% iron,
0-0.30% copper,
0.30-1.00% manganese,
0-0.10% magnesium,
0-0.10% zinc by weight.

It has been seen that mechanical and electrochemical properties of the final product has been improved by using strontium in the aluminum alloy produced with the twin roll continuous casting method. In relation therewith, FIG. 1 (a, b, c) shows the effect of addition of strontium in the twin roller continuous casting method over the corrosion resistance of the aluminum alloy. Accordingly, as the amount of strontium in the alloy increases, the open circuit potential graph of the final material moves towards a more positive value and it is seen that the corrosion resistance increases accordingly.

Iron which is one of the other components likely to be present within the aluminum alloy material of the invention is a compulsory impurity coming from the raw material. It increases the strength by forming the Al—Fe intermetallic. However, since higher iron ratios lower the ductility, the iron ratio within the material is being kept in the ratio of at most 2% in the scope of the invention.

While copper increases the tensile and fatigue strength of the alloy together with strength, high copper ratios cause decrease in the ductility and corrosion resistance of the alloy material. Therefore, the copper ratio in the final material is at most 0.30% in the scope of the invention.

Manganese provides increase in the fatigue strength and corrosion resistance alloy material of the invention. Furthermore, it has positive effect for ductility in alloys comprising Fe—Si.

Magnesium provides increase in mechanical strength without creating decrease in ductility.

Since zinc increases the corrosion tendency of the alloys although playing a role in increasing strength in magnesium alloys, its use or preference within the material of the invention has been kept very low.

Aluminum alloy materials developed with the method of the invention are suitable for use to be in direct contact with all kinds of food during processing, heating, cooling and preserving of food. Since the aluminum alloy material produced with the method of the invention lowers the amount of the aluminum released to the food, it is much more reliable compared to aluminum foil and similar products in the prior art. Also, by means of the process (annealing and rolling) steps applied in the method of the invention and the synergy arising from the composition of the processed liquid metal mixture, not only providing an aluminum alloy material having improved mechanical and electrochemical properties is possible but at the same time production cost is being decreased by saving energy and time.

The invention claimed is:

1. An aluminum foil composition comprising:
   aluminum being at least 95.85% to 98.35% by weight of the aluminum foil composition;
   strontium being 0.50% 0.05% to 0.25% by weight of the aluminum foil composition;
   silicon being 0.10% to 0.40% by weight of the aluminum foil composition;
   iron being 1.20% to 2% by weight of the aluminum foil composition;
   copper being no more than 0.30% by weight of the aluminum foil composition;
   manganese being 0.30% to 1.00% by weight of the aluminum foil composition;
   magnesium being no more than 10% by weight of the aluminum foil composition; and
   zinc being no more than 0.10% by weight of the aluminum foil composition, the aluminum foil composition being produced by a twin roll continuous casting process with cold rolling.

2. The aluminum foil composition of claim 1, wherein the aluminum foil has an open circuit potential that is more positive than −0.75 volts.

* * * * *